United States Patent
Yarabolu et al.

(10) Patent No.: US 11,057,373 B2
(45) Date of Patent: Jul. 6, 2021

(54) SYSTEM FOR AUTHENTICATION USING CHANNEL DEPENDENT ONE-TIME PASSWORDS

(71) Applicant: BANK OF AMERICA CORPORATION, Charlotte, NC (US)

(72) Inventors: Vijay Kumar Yarabolu, Hyderabad (IN); Nagasubramanya Lakshminarayana, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 316 days.

(21) Appl. No.: 16/193,087

(22) Filed: Nov. 16, 2018

(65) Prior Publication Data
US 2020/0162450 A1    May 21, 2020

(51) Int. Cl.
| | |
|---|---|
| *H04L 29/06* | (2006.01) |
| *G06F 21/31* | (2013.01) |
| *H04W 12/71* | (2021.01) |
| *H04W 12/72* | (2021.01) |
| *H04L 9/32* | (2006.01) |

(52) U.S. Cl.
CPC ........ *H04L 63/0838* (2013.01); *H04L 63/083* (2013.01); *H04L 63/102* (2013.01); *H04L 63/18* (2013.01); *G06F 21/31* (2013.01); *H04L 9/32* (2013.01); *H04L 2463/082* (2013.01)

(58) Field of Classification Search
CPC ... H04L 63/0838; H04L 63/102; H04L 29/06; H04L 63/083; H04L 63/18; H04L 2463/082; H04L 9/32; H04W 12/71; H04W 12/72; G06F 21/31
See application file for complete search history.

(56) References Cited

U.S. PATENT DOCUMENTS

| | | |
|---|---|---|
| 7,251,218 B2 | 7/2007 | Jorgensen |
| 7,870,044 B2 | 1/2011 | Robertson |
| 7,954,150 B2 | 5/2011 | Croft et al. |
| 8,112,794 B2 | 2/2012 | Little et al. |
| 8,213,906 B2 | 7/2012 | Chen |
| 8,228,861 B1 | 7/2012 | Nix |
| 8,316,237 B1 | 11/2012 | Felsher et al. |
| 8,346,929 B1 | 1/2013 | Lai |
| 8,412,928 B1 | 4/2013 | Bowness |
| 8,751,801 B2 | 6/2014 | Harris et al. |
| 8,850,010 B1 | 9/2014 | Qureshi |
| 8,898,749 B2 | 11/2014 | Tohmo et al. |
| 9,002,750 B1 | 4/2015 | Chu et al. |

(Continued)

*Primary Examiner* — Jayesh M Jhaveri
(74) *Attorney, Agent, or Firm* — Michael A. Springs; Moore & Van Allen PLLC; Seongun M. Hong

(57) ABSTRACT

The present disclosure is directed to a novel system for using a dual factor authorization design for generating channel-dependent one-time passwords. In particular, the system may extract a client code and user code from an authorization code to be sent to a client and a user, respectively. When the user submits the user code via the client, the user code is combined with the client code to create the full authorization code to allow for the authentication of the user. The authorization code may further be mapped to a specific client and/or context. In this way, the system provides a secure way to minimize the incidence of unauthorized access to a user's account without creating additional technical burdens for the user.

20 Claims, 4 Drawing Sheets

(56) References Cited

U.S. PATENT DOCUMENTS

| | | | |
|---|---|---|---|
| 9,292,668 B1 | 3/2016 | Spangler et al. | |
| 9,319,401 B2 | 4/2016 | Gill et al. | |
| 9,407,633 B2 | 8/2016 | Gill et al. | |
| 2003/0236847 A1* | 12/2003 | Benowitz | H04L 63/0428 |
| | | | 709/206 |
| 2006/0156385 A1* | 7/2006 | Chiviendacz | H04L 9/3271 |
| | | | 726/2 |
| 2007/0033642 A1* | 2/2007 | Ganesan | H04L 9/3247 |
| | | | 726/10 |
| 2008/0010455 A1 | 1/2008 | Holtzman et al. | |
| 2008/0034440 A1 | 2/2008 | Holtzman et al. | |
| 2008/0098464 A1* | 4/2008 | Mizrah | G06F 21/36 |
| | | | 726/5 |
| 2010/0138652 A1 | 6/2010 | Sela et al. | |
| 2011/0029436 A1* | 2/2011 | Norvell | G06Q 30/02 |
| | | | 705/67 |
| 2012/0311322 A1 | 12/2012 | Koyun et al. | |
| 2015/0143496 A1* | 5/2015 | Thomas | G06F 21/34 |
| | | | 726/7 |
| 2016/0239655 A1* | 8/2016 | Sadacharam | G06F 21/36 |
| 2016/0364555 A1* | 12/2016 | Child | G06F 21/6218 |
| 2018/0176222 A1* | 6/2018 | Bhaskar | H04L 63/0815 |
| 2020/0259661 A1* | 8/2020 | Falk | H04W 12/06 |

* cited by examiner

SYSTEM FOR AUTHENTICATION USING CHANNEL DEPENDENT ONE-TIME PASSWORDS

FIELD OF THE INVENTION

The present disclosure embraces a system, computer program product, and computer-implemented method for a system for authentication using channel-dependent one-time passwords.

BACKGROUND

Conventional methods of generating one time passwords may be vulnerable to misuse by unauthorized users or attackers. For example, if the attacker is able to gain access to an unused and/or unexpired password, the attacker may use the password to complete functions with different clients and/or contexts. Accordingly, there is a need for a more secure way to generate and implement the use of one time passwords.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a novel system for using a dual factor authorization design for generating channel-dependent one-time passwords. In particular, the system may extract a client code and user code from an authorization code to be sent to a client and a user, respectively. When the user submits the user code via the client, the user code is combined with the client code to create the full authorization code to allow for the authentication of the user. The authorization code may further be mapped to a specific client and/or context. In this way, the system provides a secure way to minimize the incidence of unauthorized access to a user's account without creating additional technical burdens for the user.

Accordingly, embodiments of the present disclosure provide a dual factor authorization system for authentication of a user. The system may comprise a processor; a communication interface; and a memory having executable code stored thereon. The executable code, when executed by the processor, may cause the processor to receive, from a user computing system, a request to access an entity system; generate an authorization code associated with the user; extract a client code and a user code from the authorization code; transmit the client code to the user computing system via a first channel; transmit the user code to the user via a second channel; receive a reformed authorization code from the user computing system; and compare the authorization code with the reformed authorization code.

In some embodiments, the executable code further causes the processor to detect that the reformed authorization code matches the authorization code; and authorize the user to access the entity system.

In some embodiments, the executable code further causes the processor to detect that the reformed authorization code does not match the authorization code; and reject the request to access the entity system.

In some embodiments, the authorization code is restricted to a first context, wherein the reformed authorization code comprises a second context. In such embodiments, the executable code may cause the processor to detect that the reformed authorization code matches the authorization code; detect that the first context matches the second context; and authorize the user to access the entity system. In other embodiments, the executable code further causes the processor to detect that the reformed authorization code matches the authorization code; detect that the first context does not the second context; and reject the request to access the entity system.

In some embodiments, the executable code further causes the processor to generate a hash of the authorization code using a hash algorithm; store the hash of the authorization code in a database; and generate a hash of the reformed authorization code using the hash algorithm, wherein comparing the authorization code with the reformed authorization code comprises comparing the hash of the authorization code with the hash of the reformed authorization code.

In some embodiments, the authorization code is a one-time password.

In some embodiments, the client code is tied to the user computing system.

In some embodiments, transmitting the user code to the user comprises transmitting the user code to a second user computing system.

In some embodiments, transmitting the user code to the user comprises transmitting the user code to the user computing system.

Embodiments of the present disclosure also provide a computer program product for a dual factor authorization system for authentication of a user. The computer program product may comprise at least one non-transitory computer readable medium having computer-readable program code portions embodied therein. The computer-readable program code portions may comprise an executable portion for receiving, from a user computing system, a request to access an entity system; an executable portion for generating an authorization code associated with the user; an executable portion for extracting a client code and a user code from the authorization code; an executable portion for transmitting the client code to the user computing system via a first channel; an executable portion for transmitting the user code to the user via a second channel; an executable portion for receiving a reformed authorization code from the user computing system; and an executable portion for comparing the authorization code with the reformed authorization code.

In some embodiments, the computer-readable program code portions further comprise an executable portion for detecting that the reformed authorization code matches the authorization code; and an executable portion for authorizing the user to access the entity system.

In some embodiments, the computer-readable program code portions further comprise an executable portion for detecting that the reformed authorization code does not match the authorization code; and an executable portion for rejecting the request to access the entity system.

In some embodiments, the authorization code is restricted to a first context, wherein the reformed authorization code comprises a second context. In such embodiments, the computer-readable program code portions further comprise an executable portion for detecting that the reformed authorization code matches the authorization code; an executable portion for detecting that the first context does not the second context; and an executable portion for rejecting the request to access the entity system.

In some embodiments, the computer-readable program code portions further comprise an executable portion for generating a hash of the authorization code using a hash algorithm; an executable portion for storing the hash of the authorization code in a database; and an executable portion for generating a hash of the reformed authorization code using the hash algorithm, wherein comparing the authorization code with the reformed authorization code comprises comparing the hash of the authorization code with the hash of the reformed authorization code.

Embodiments of the present disclosure also provide a computer-implemented method for a dual factor authorization system for authentication of a user. The method may comprise receiving, from a user computing system, a request to access an entity system; generating an authorization code associated with the user; extracting a client code and a user code from the authorization code; transmitting the client code to the user computing system via a first channel; transmitting the user code to the user via a second channel; receiving a reformed authorization code from the user computing system; and comparing the authorization code with the reformed authorization code.

In some embodiments, the method further comprises detecting that the reformed authorization code matches the authorization code; and authorizing the user to access the entity system.

In some embodiments, the method further comprises detecting that the reformed authorization code does not match the authorization code; and rejecting the request to access the entity system.

In some embodiments, the authorization code is restricted to a first context, wherein the reformed authorization code comprises a second context. In such embodiments, the method further comprises detecting that the reformed authorization code matches the authorization code; detecting that the first context does not the second context; and rejecting the request to access the entity system.

In some embodiments, the method further comprises generating a hash of the authorization code using a hash algorithm; storing the hash of the authorization code in a database; and generating a hash of the reformed authorization code using the hash algorithm, wherein comparing the authorization code with the reformed authorization code comprises comparing the hash of the authorization code with the hash of the reformed authorization code.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
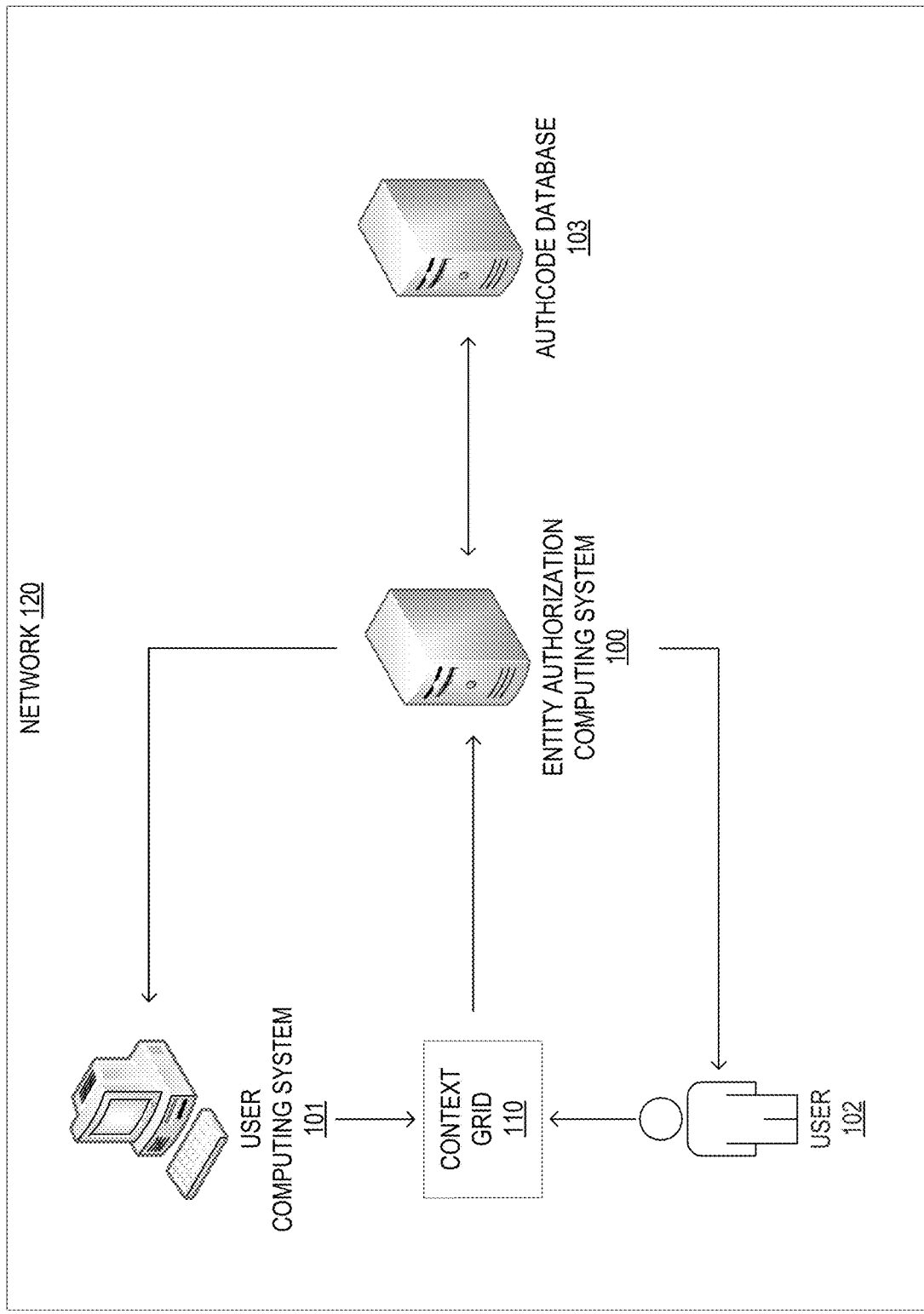
Figure 2:
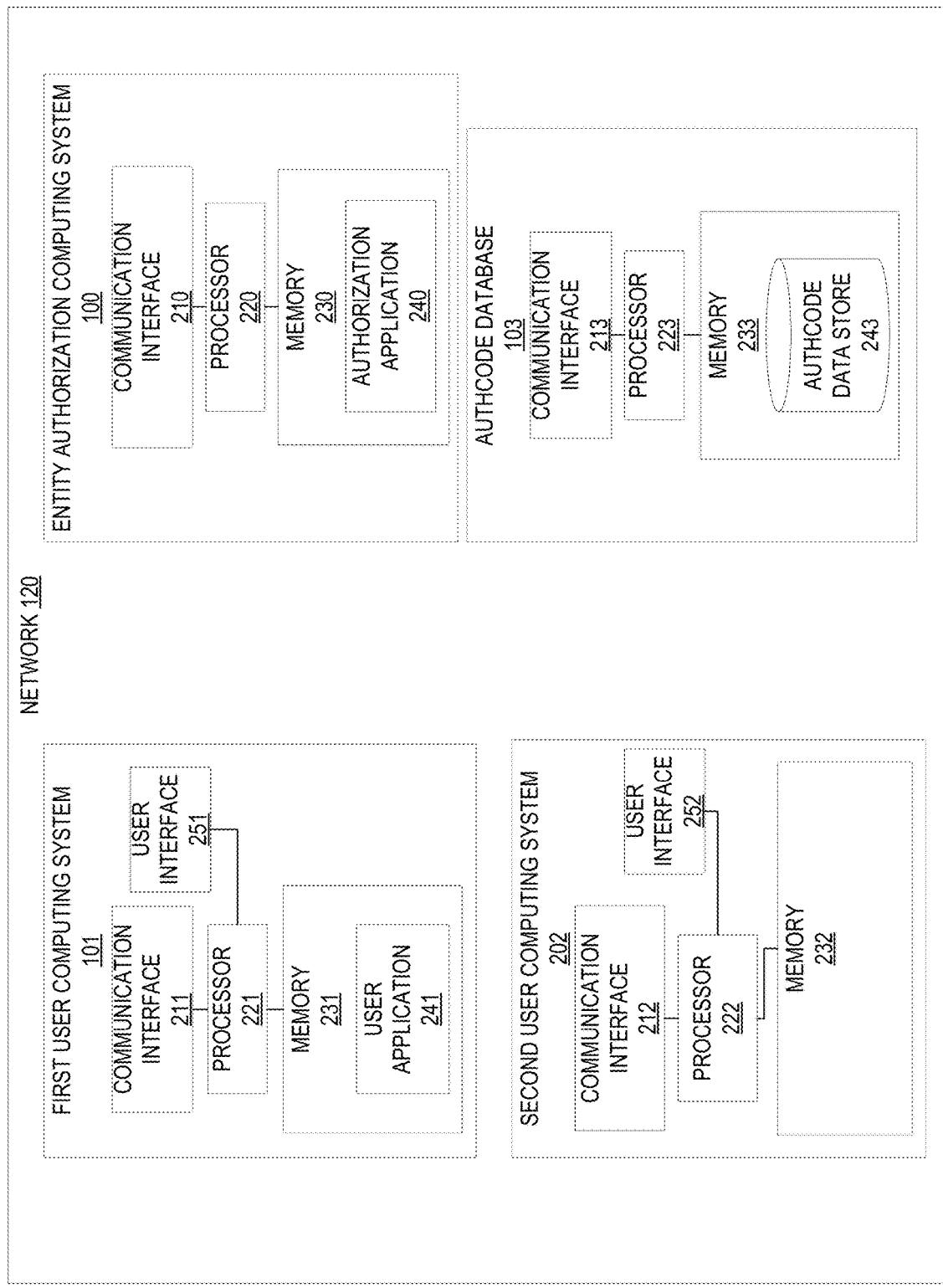
Figure 3:
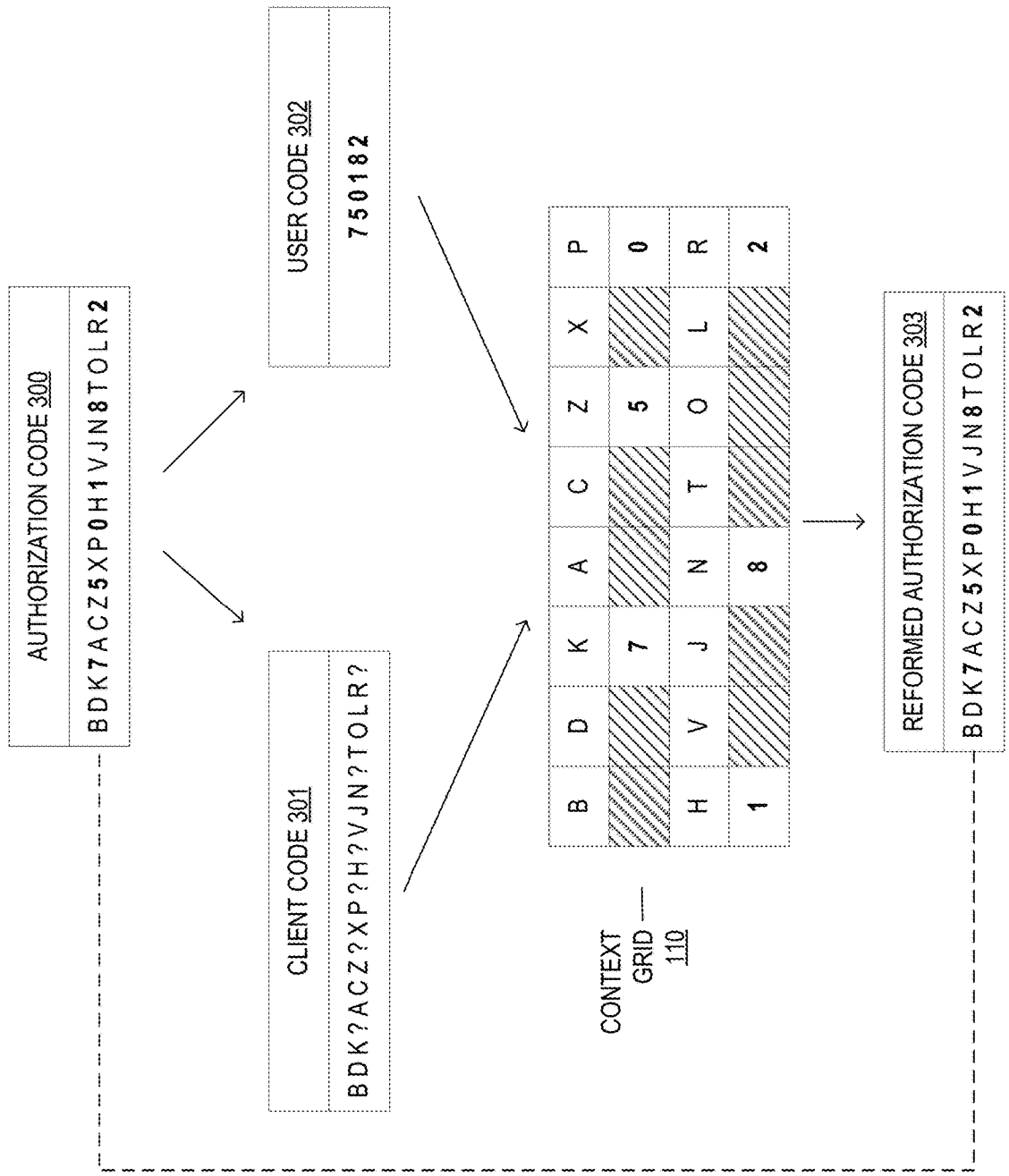
Figure 4:
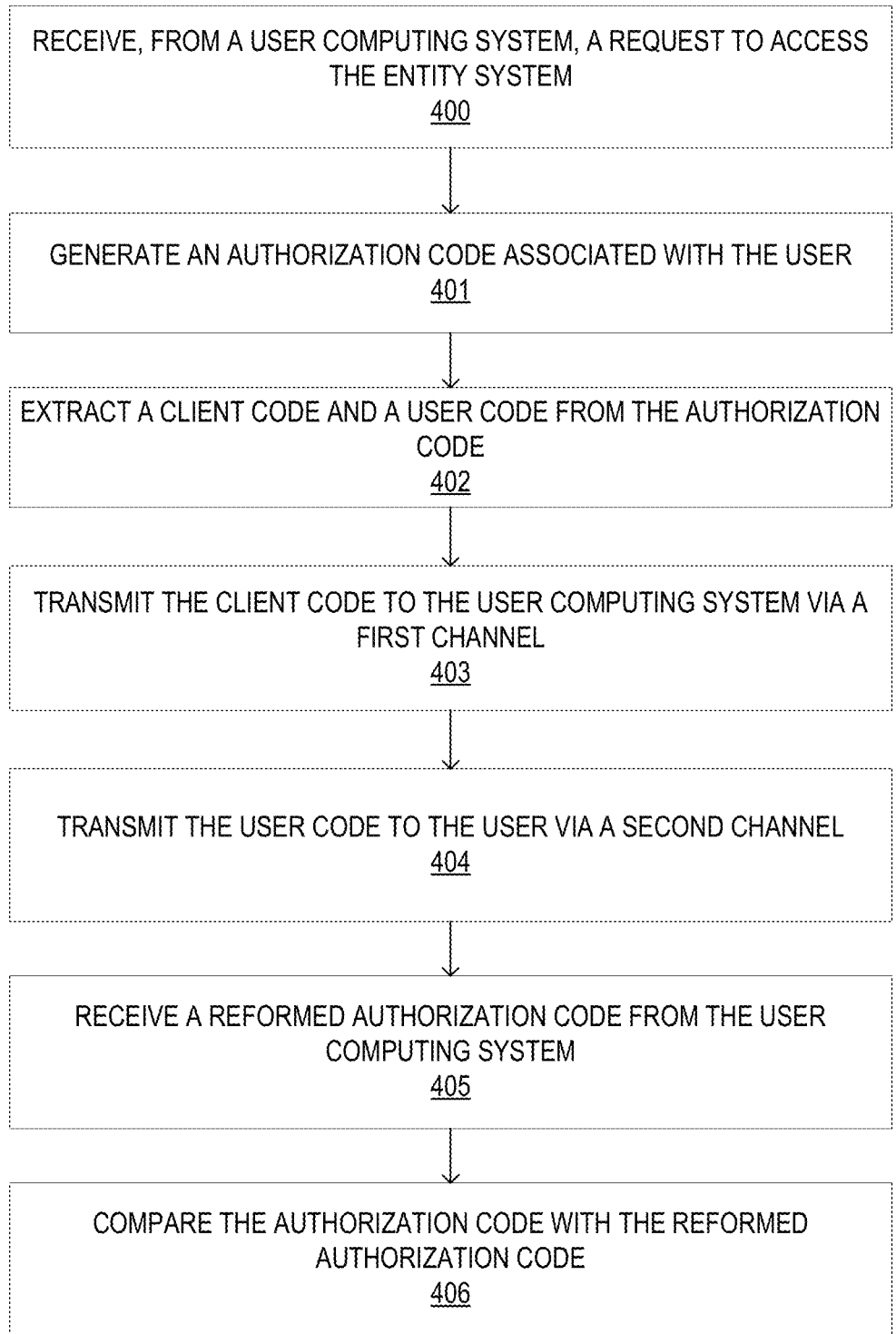

Having thus described embodiments of the disclosure in general terms, reference will now be made to the accompanying drawings, wherein:

FIG. 1 is a block diagram illustrating an operating environment for the dual factor authorization system, in accordance with some embodiments of the present disclosure;

FIG. 2 is a block diagram illustrating the entity authorization computing system, the first user computing system, a second user computing system, and the authcode database in more detail, in accordance with some embodiments of the present disclosure;

FIG. 3 is a block diagram illustrating an exemplary client code and user code pair within an exemplary context grid, in accordance with some embodiments of the present disclosure; and FIG. 4 is a process flow for the dual factor authorization system, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the dual factor authentication system is implemented. The entity may be a business organization, a non-profit organization, a government organization, and the like, which may routinely use various types of applications within its enterprise environment to accomplish its objectives.

"Entity system" as used herein may refer to the computing systems, devices, software, applications, and/or other resources used by the entity to accomplish its objectives. Accordingly, the entity system may comprise database servers, Internet-of-Things ("IoT") devices, compute nodes, networked terminals, smart devices (e.g., smart watches), and/or other types of computing systems or devices along with their associated applications.

"Computing system" or "computing device" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like within an entity's premises. In some embodiments, the computing system may be a local or remote server which is configured to send and/or receive inputs from other computing systems on the network.

"Client," "client computing system," or "user computing system" as used herein may refer to a computing system or device owned and/or operated by the user to access the entity system.

"Application context" or "context" as used herein may refer to a specific environment, purpose, or scenario in which the user access the system. For instance, the context may be a request to change a current password, a request to access account information, a request to conduct a resource transfer, or the like.

"Resource" as used herein may refer to a tangible or intangible objects used by the entity or its users to accomplish certain objectives of the entity or user. Accordingly, resources may include computing resources, data files, documents, funds, or the like.

Embodiments of the present disclosure provide a dual factor authorization system for authenticating a user via channel-dependent one-time passwords. In particular, the system send a generated one-time authorization code (or "authcode") to a user when the user attempts to take an action which requires the user to be authenticated within the system. For instance, the system may require the user to provide the authorization code when logging onto the entity system, accessing the user's account information, conducting transactions, or the like. The system may, using an authorization code generator, generate an authorization code to be used to authorize the user. In some embodiments, the authorization code may be linked to a particular client (e.g., a user computing system) such that authorization codes submitted by a different computing system will not be accepted by the system. In some embodiments, the authorization code may be linked to a particular context for which the user has requested the authorization code (e.g., for changing an account password), such that attempts to use the authorization code for other contexts (e.g., conducting a transaction) will not be authorized by the system. The authorization code may be hashed using a hash algorithm (e.g., SHA, MD5, or the like) and stored in an authorization code database.

Subsequently, the system may extract a first code (e.g., a "client" code) and a second code (e.g., a "user" code) from the generated authorization code. For instance, if the authorization code is an alphanumeric character string, the client code may comprise the alphabetic portions of the authorization code, where the user code may comprise the numeric portions of the authorization code. In some embodiments, the first code and second code may be sent to the user via separate channels. For example, the client code may be transmitted to a first user computing system and the user code may be transmitted to the user through a second user computing system. In other embodiments, the client code may be transmitted to the first user computing system via a first method (e.g., a cookie, secure token, or the like), while the user code is transmitted to the same computing system via a second method (e.g., e-mail, SMS, voice call, or the like). In such embodiments, the client code may be tied to a particular computing device and may not be visible to the user, while the user code may be visible to the user.

Once both the client code and user code have been transmitted to the user, the entity system may present a user interface to the user (e.g., via the first user computing system), where the user interface may comprise one or more input fields (e.g., text entry fields, number and/or key pads, or the like) into which the user may enter the user code. Once the user has transmitted the user code to the entity system, the entity system may combine the client code with the user code into a context grid. In some embodiments, the context grid may be a matrix of characters, wherein the positions of the characters within the matrix correspond to the positions of the characters within the authorization code. In such embodiments, the client code may comprise one or more special characters (e.g., a question mark, a blank space, or the like) which may indicate spaces in which characters from the user code may be entered. Typically, the user does not see the client code or context grid generated by the entity system; rather, the context grid is hidden from the user and used for the purposes of creating a reformed authorization code using the client code and user code.

The reformed authorization code, once generated, may be transmitted to the entity system for verification. In some embodiments, the entity system may compare the values of the hashed authorization code stored in the authorization code database with hashed values of the reformed authorization code received from the user computing system. If the two authorization codes match, the entity system may authorize the user to take the requested action within the entity system. Conversely, if the two authorization codes do not match, the entity system may prevent the user from taking the requested action with the entity system.

The system as disclosed herein addresses a number of technology-centric challenges associated with using one-time passwords to authenticate users. By using client and/or context-dependent authorization codes as described herein, the entity system greatly increases the security of the user's account by preventing unauthorized users from using improperly obtained authorization codes on different devices and/or in different contexts. Furthermore, generating context grids from user codes and client codes using the dual factor authorization process as described herein further increases the security of the user's computing systems while accessing the entity system while creating no additional friction to the user during the authentication process.

Turning now to the figures, FIG. 1 is a block diagram illustrating an operating environment for the dual factor authorization system, in accordance with some embodiments of the present disclosure. In particular, the operating environment may include an entity authorization computing system 100, a user computing system 101, a user 102, and an authcode database 103 in operative communication with one another within a network 120. The network 120, as well as other networks as described herein, may be a global area network (GAN), such as the Internet, a wide area network (WAN), a local area network (LAN), cellular communications network, or any other type of network or combination of networks. The network may provide for wireline, wireless, or a combination wireline and wireless communication between devices on the network.

The entity authorization computing system 100 may be a computing system that controls the authorization process of users within the entity system. Accordingly, the entity authorization computing system 100 may execute various processes in authorizing users, such as generating codes and/or passwords (e.g., authorization codes, client codes, user codes, or the like), transforming authorization codes via a hash algorithm, provisioning codes and/or passwords to the user, verifying authorization codes and/or context grids, and the like.

The operating environment may further comprise a user computing system 101 which may be owned and/or operated by a user 102. The user computing system 101 may be used by the user 102 to submit a request for a one-time authorization code for the purposes of creating an authenticated session within the entity system. In this regard, the user computing system 101 may be a personal device such as a desktop computer, laptop computer, smartphone or smart device, IoT device, single board computer, or the like. The user computing system 101 may be configured to receive a client code from the entity authorization computing system 100, where the client code may be linked with an identifier associated with the user computing system 101 (e.g., a hardware ID, MAC address, secured token, or the like) such that the same client code may not be used on a computing system other than the user computing system 101. The client code may then be combined with a separate user code in a context grid 110 to create a reformed authorization code, which may then be sent to the entity authorization computing system 100 for verification, as will be described in further detail herein.

In some embodiments, the entity authorization computing system 100 may provide a user code to the user 102 by sending the user code to another device owned and/or operated by the user 102. In such embodiments, the user computing system 101 may represent a first user computing system and the user 102 as depicted in FIG. 1 may represent a second user computing system. The second user computing system may typically be a portable device such as a smartphone, smart device, mobile authenticator, tablet, or the like. That said, it is within the scope of the disclosure for the second user computing system to be a desktop, laptop, or any other computing system as described herein. In such embodiments, the user code may be provided to the user 102 through the second user computing system (e.g., by e-mail, SMS, file transfer protocols, voice calls, or the like).

In other embodiments, the user 102 may receive the user code through the user computing system 101. In other words, the user computing system 101 may receive both the client code and the user code. In such embodiments, the client code may typically be sent via a first channel whereas the user code may be sent via a second channel which is distinct from the first channel. For example, the client code may be transmitted to the user computing system 101 via a secure token, web download, a third party application, or the like (e.g., the first channel), while the user code may be transmitted to the user computing system 101 via e-mail, SMS, authenticator application, voice call, or the like (e.g., the second channel).

Once the user 102 receives the user code, the user 102 may enter the user code into an interface within the user computing system 101. The user computing system 101 may then combine the digits of the user code into the appropriate positions within the client code, then subsequently use the combination of digits to populate a context grid 110, which comprises the reformed authorization code to be sent to the entity authorization computing system 100 for verification.

The operating environment may further comprise an authcode database 103 which may store hashed values of authorization codes generated by the entity authorization computing system 100. Upon receiving the reformed authorization code from the user computing system 101, the entity authorization computing system 100 may generate a hash from the reformed authorization code and compare the values to the hashed authorization code stored within the authcode database 103. If the entity authorization computing system 100 detects a match, the entity authorization computing system 100 may validate the reformed authorization code and allow the code to be used for the specific purpose for which the authorization code was requested.

It should be understood by those having ordinary skill in the art that although certain devices and/or structures are depicted as single units in FIG. 1, each of the depicted components, or sub-components therein, may represent multiple units. For instance, in some embodiments, a given computing system as depicted in FIG. 1 may represent multiple systems configured to operate in a distributed fashion (e.g., the entity authorization computing system 100 and/or the authcode database 103 may represent multiple computing systems across which the authorization workload is distributed). In other embodiments, the functions of multiple computing systems may be accomplished by a single system. For example, although the authcode database 103 is depicted as a separate structure from the entity authorization computing system 100, the functions of the authcode database 103 may also be accomplished by the entity authorization computing system 100, according to some embodiments.

FIG. 2 is a block diagram illustrating the entity authorization computing system 100, the first user computing system 101, a second user computing system 202, and the authcode database 103 in more detail, in accordance with some embodiments of the present disclosure. The entity authorization computing system 100 may comprise a processor 220 communicably coupled to such devices as a communication interface 210 and a memory 230. The processor 220, and other processors described herein, typically includes circuitry for implementing communication and/or logic functions of the computing systems or devices as described herein. For example, the processor 220 may include a digital signal processor device, a microprocessor device, and various analog to digital converters, digital to analog converters, and/or other support circuits. The entity authorization computing system 100 may use the communication interface 210 to communicate with other devices over the network 120. The communication interface 210 as used herein may include an Ethernet interface or other type of data port, an antenna coupled to a transceiver configured to operate on a cellular data, GPS, or WiFi signal, and/or a near field communication ("NFC") interface. In some embodiments, a processing device, memory, and communication device may be components of a controller, where the controller executes one or more functions based on the code stored within the memory.

The memory 230 of the entity authorization computing system 100 may comprise an authorization application 240. As used herein, "memory" includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like.

The authorization application 240 may comprise executable code for performing authorization processes of a user via one-time passwords. In this regard, the authorization application 240 may comprise executable code for functions such as the generation of authorization codes (e.g., an authcode generator), the extraction of client codes and user codes from authorization codes, executing hash algorithms on authorization codes and storing hashed values in the authcode database 130, validating authorization codes based on context grids, and the like.

The first user computing system 101 may also comprise a processor 221 in operative communication with a communication interface 211 and a memory 231. The first user computing system 101 may further comprise a user interface 251, which may comprise the hardware and software implements to accept input from and provide output to the user. The user interface 251 may comprise hardware such as a display, audio output devices, projectors, and the like, or input devices such as keyboards, mice, sensors, cameras, microphones, biometric input devices (e.g., fingerprint readers), and the like. The user interface 251 may further comprise software such as a graphical or command-line interface through which the user may provide inputs and/or receive outputs from the first user computing system 101. It should be understood that the display on which the user interface 251 is presented may include an integrated display (e.g. a tablet or smartphone screen) within the first user computing system 101, or an external display device (e.g. a computer monitor or television).

The memory 231 of the first user computing system 101 may comprise a user application 241 stored thereon. The user application 241 may allow a user to access the entity system to request an authorization code for the purposes of performing some action within the entity system (e.g., accessing account information, changing passwords, using entity services, performing transactions, or the like). The user application 241 may further be configured to receive client codes and/or user codes from the entity authorization computing system 100. In such embodiments, the user code may be displayed to a user via the user interface 251 while the client code is typically hidden from the user. In this regard, the user application 241, though depicted as a single unit, may represent multiple applications within the first user computing system 101 (e.g., a web browser, e-mail client, messaging client, third party application, entity provided application, or the like, or any combination of the foregoing).

In an exemplary embodiment, the first user computing system 101 may store the client code in an entity-provided application as a secured token, encrypted file, or the like. The user may receive the user code via an e-mail client from the entity authorization computing system 100, where the user may then input the user code into a web page displayed within a web browser on the first user computing system 101. Once the user has inputted the user code, the first user computing system 101 may combine the user code and client code to create a reformed authorization code to be used in authenticating the user. Further details about the creation of authorization codes will be provided in the discussion regarding FIGS. 3 and 4.

The second user computing system 202 may also comprise a processor 222 communicatively coupled with such devices as a communication interface 212 and a memory 232. In some embodiments, the memory 232 of the second user computing system 102 may also comprise a user application as described above. The second user computing system 202 may also comprise a user interface 252 through which the user may receive the user code. In certain embodiments, the user application within the second user computing system 202 may be an e-mail client, a web browser, telephony application, entity-provided application, or other application which may be used to receive the user code. In some embodiments, the user code is displayed on the user interface 252 (e.g., on a screen, projection, monitor, or the like) such that the user may read the user code and enter the user code into the user interface 251 of the first user computing system 101.

The authcode database 103 may also comprise a processor 223 operatively coupled to a communication interface 213 and a memory 233, wherein the memory 233 has an authcode data store 243 stored thereon. The authcode data store 243 may comprise hashed values authorization codes generated by the entity authorization computing system 100. The hashed values may be used to validate reformed authorization codes generated by the first user computing system 101

FIG. 3 is a block diagram illustrating an exemplary client code and user code pair within an exemplary context grid, in accordance with some embodiments. A user may access the entity system to take a specific action which requires the user to be authenticated (e.g., accessing user account information). In response, the entity system may generate an authorization code 300, which may be a one-time password that expires after being validated once, to begin the authentication process. The authorization code 300, like other codes or passwords as described herein, may be a character string (e.g., sequence of characters and/or digits). In an exemplary embodiment, the authorization code 300 may be an alphanumeric string, such as BDK7ACZ5XPOH1VJN8TOLR2. The remainder of the discussion with respect to FIG. 3 will be refer to this exemplary character string. In some embodiments, the entity system may generate a hash of the authorization code 300 and store the hash within an authcode database 103 to be used later on in the validation process. The hash algorithm may be an MD5, SHA, or other type of asymmetric hash algorithm which produces fixed-length outputs from variable character and/or file inputs.

Once the authorization code 300 has been generated, the entity system may extract a client code 301 and a user code 302 from the authorization code 300. In some embodiments, the client code 301 may be an alphabetic string and the user code 302 may be a numeric string. Therefore, continuing the example introduced above, the entity system may generate the client code 301 by extracting the alphabetic characters from the authorization code 300 to create an exemplary client code 301 of BDK?ACZ?XP?H?VJN?TOLR?, wherein the question mark characters represent the positions of characters which were not extracted from the authorization code 300 to create the client code 301. Likewise, the entity system may extract the remaining characters (e.g., the numeric characters) from the authorization code 300 to create the exemplary user code 302 of 750182. It should be understood that other models or paradigms of generating client codes 301 and user codes 302 are within the scope of the disclosure. For instance, a user code 301 may be generated by extracting every fourth character of the authorization code 300.

Once generated, the client code 301 may be transmitted to the user computing system 101 via a first channel, while the user code 302 may be transmitted to the user 102 (e.g., via a second user computing system 202 and/or a second channel or method). The client code 301 and/or the user code 302 may be tied to a specific device and/or context such that attempts to use either code 301, 302 on a different device and/or for a different purpose may cause the entity system to reject the authentication of the user. Typically, the client code 301 is stored on the user computing system 101 but not displayed to the user. Rather, in an exemplary embodiment in which the user code 302 is a six-digit code (e.g., 750182), the user 102 may simply be provided a text entry box or an input field comprising six visible boxes into which the user 102 may enter the user code 302 (e.g., using a keyboard, numerical pad, touchscreen, voice commands, or the like).

The user computing system 101, after receiving the user code 302 from the user 102, may generate a context grid 110 to combine the user code 302 with the client code 301. In particular, the context grid 100 may be a matrix of cells, wherein each cell may be populated with a single character or digit. The entity system may first sequentially populate the context grid 100 with the characters in the client code 301 (e.g., in a horizontal direction) other than the characters which are represented by question marks. Each cell containing a non-question mark character may be associated with a vertically adjacent cell within the context grid 100. If a non-question mark character is immediately followed by a question mark character, the vertically adjacent cell of said non-question mark character may be opened to accept character inputs from the user 102 (e.g., a digit of the user code 302). On the other hand, if a non-question mark character is followed by another non-question mark character, the vertically adjacent cell may be closed to user inputs (see diagonally shaded cells in the context grid 110). The digits of the user code 302 may be sequentially entered into the open vertically adjacent cells within the context grid 110.

Once the context grid 110 has been filled with the client code 301 and the user code 302, a reformed authorization code 303 may be generated from the context grid 110. The reformed authorization code 303 may then be compared to the original authorization code 300 generated by the entity system. If the codes 300, 303 match, then the entity system may authorize the user 102 to take the requested action within the entity system. If the codes 300, 303 do not match, then the entity system may deny access to the user 102 until a matching reformed authorization code 303 is provided. In some embodiments, the entity system may first input the reformed authorization code 303 into a hash algorithm (e.g., the same hash algorithm as was used to generate a hash of the original authorization code 300) and subsequently compare the hashed reformed authorization code with the hashed original authorization code stored within the authcode database 103.

FIG. 4 is a process flow for the dual factor authorization system, in accordance with some embodiments. The process begins at block 400, where the system receives, from a user computing system, a request to access the entity system. In some embodiments, a user's account settings may require that a two-factor authentication system be used when taking certain actions within the entity system. For instance, two-factor authentication may be required when the user initially logs into the system, requests to change and/or view account information, conducts transactions, or the like. In such embodiments, the user may be required to provide a first authentication credential (e.g., a username and password combination, PIN, biometric data, secured token, or the like) and a second authentication credential (e.g., a one-time password).

The process continues to block 401, where the system generates an authorization code associated with the user. The system may generate the authorization code using an authcode generator, which may be an application, algorithm (e.g., a hash function), or other type of object which uses seed input values to create an authcode output. Examples of such seed input values may include the time and/or date, a user ID, a hardware ID, a context ID, or the like. Typically, the authorization code is a limited-use password such that once the authorization code has been used a threshold number of times (e.g., one-time passwords may be used only once), the authorization code is no longer valid for future use. In addition, the generated authorization code may also be context-dependent. For example, if the user originally requested a one-time password to authorize the user to change account information (e.g., a first context), the one-time password will not be valid for use in conducting transactions (e.g., a second context). In this way, even if the one-time password is compromised by an unauthorized user, the unauthorized user will be restricted in the number and/or types of actions which may be taken within the entity system.

In some embodiments, the system may create a fixed-length hash of the generated authorization code using a hash algorithm. The system may then store the hash of the authorization code in an authcode database. After storing the hash of the authorization code, the system may recall the hash when validating the inputs received from the user.

The process continues to block 402, where the system extracts a client code and a user code from the authorization code. The client code and/or the user code may be extracted from the authorization code using various models. In an exemplary embodiment, if the authorization code is an alphanumeric string, the client code may comprise the alphabetic characters (e.g., letters) of the authorization code while the user code may comprise the numerical characters (e.g., numbers) of the authorization code. In some embodiments, the client code may retain the position of the characters which were not extracted from the authorization code to form the client code (e.g., the numbers which were extracted for creating the user code). In such embodiments, the client code may be a string which comprises letters and placeholders/

In some embodiments, the authorization code may be associated with a particular device ID. For instance, the authorization code may specifically be generated for use by the user computing system (e.g., by using the hardware ID of the user computing system as a seed input value). In such embodiments, because the client code is derived from the authorization code, the client code is also specifically tied to the user computing system. Thus, even if the user code is intercepted by an unauthorized user, the resulting authorization code will not be valid for authenticating the user if a device other than the user computing system is used to access the entity system.

The process continues to block 403, where the system transmits the client code to the user computing system via a first channel. The first channel may be a data transfer method in which the client code is temporarily stored on the user computing system. In this regard, the user computing system may receive the client code as an encrypted file, secure token, or the like. In some embodiments, the user computing system may receive the client code through an entity-provided application. Typically, the client code is stored on the user computing system while being hidden from the user.

The process continues to block 404, where the system transmits the user code to the user via a second channel. In some embodiments, the user code may be transmitted to a second user computing system associated with the user through a second channel, which is distinct from the first channel. In an exemplary embodiment, the user code may be transmitted to a smartphone of the user via a voice message, text message, instant message, e-mail message, or the like. The user code may also be transmitted via an entity-provided application (e.g., a smartphone application), where the entity-provided application may display the user code to the user via a graphical interface.

In other embodiments, the user code may be transmitted to the same user computing system that received the client code. In such embodiments, the user code is sent via the second channel such that the user may receive the user code (e.g., by viewing the user code on the display, by hearing the user code being recited through the speakers, or the like).

The process continues to block 405, where the system receives a reformed authorization code from the user computing system. At this stage, the user computing system has formed a context grid comprising a combination of the device-specific client code and the user code. In some embodiments, the system may receive the reformed authorization code in the form of the context grid. In such embodiments, the system may extract the reformed authorization code from the cells in the context grid. In other embodiments, the system may receive the reformed authorization code in an extracted form.

The process concludes at block 406, where the system compares the authorization code with the reformed authorization code. At this step, the system may generate a hash using the reformed authorization code via the same hash algorithm that was used to generate a hash of the originally created authorization code. The system may then compare the hash of the reformed authorization code with the hash of the original authorization code stored in the authcode database. If the reformed authorization code matches the original authorization code (e.g., the correct client code and user code were used to generate the reformed authorization code), then the hashes of the two codes will also match. Accordingly, the system may then validate the user.

On the other hand, if the incorrect client code is used (e.g., the authorization process was started on an unauthorized computing system) or an incorrect user code is used to generate the reformed authorization code, then there would be a mismatch between the reformed authorization code and the original authorization code. In such embodiments, the system may reject the authorization of the user. In some embodiments, the system may further restrict the use of the authorization code to certain contexts (e.g., performing a transaction). In such embodiments, even if the client code and user code are correct, the system may still reject the authorization of the user if the user attempts to complete an action in a different context from the context for which the authorization code was requested (e.g., changing an account password).

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A dual factor authorization system for authentication of a user, comprising:
 a processor;
 a communication interface; and
 a memory having executable code stored thereon, wherein the executable code, when executed by the processor, causes the processor to:
  receive, from a user computing system, a request to access an entity system;
  generate an authorization code associated with the user;
  extract a client code and a user code from the authorization code;
  transmit the client code to the user computing system via a first channel,
 wherein the client code is not visible to the user;
  transmit the user code to the user via a second channel;
  combine the client code and the user code into a reformed authorization code using a context grid, wherein the context grid is a matrix of characters corresponding to the authorization code;
 and
  compare the authorization code with the reformed authorization code to determine authorization of the user to access the entity system.

2. The system of claim 1, wherein the executable code further causes the processor to:
 detect that the reformed authorization code matches the authorization code; and
 authorize the user to access the entity system.

3. The system of claim 1, wherein the executable code further causes the processor to:
 detect that the reformed authorization code does not match the authorization code; and
 reject the request to access the entity system.

4. The system of claim 1, wherein the authorization code is restricted to a first context, wherein the reformed authorization code comprises a second context, wherein the executable code further causes the processor to:
 detect that the reformed authorization code matches the authorization code;
 detect that the first context matches the second context; and
 authorize the user to access the entity system.

5. The system of claim 1, wherein the authorization code is restricted to a first context, wherein the reformed authorization code comprises a second context, wherein the executable code further causes the processor to:
 detect that the reformed authorization code matches the authorization code;
 detect that the first context does not match the second context; and
 reject the request to access the entity system.

6. The system of claim 1, wherein the executable code further causes the processor to:
 generate a hash of the authorization code using a hash algorithm;
 store the hash of the authorization code in a database; and
 generate a hash of the reformed authorization code using the hash algorithm, wherein comparing the authorization code with the reformed authorization code comprises comparing the hash of the authorization code with the hash of the reformed authorization code.

7. The system of claim 1, wherein the authorization code is a one-time password.

8. The system of claim 1, wherein the client code is tied to the user computing system.

9. The system of claim 1, wherein transmitting the user code to the user comprises transmitting the user code to a second user computing system.

10. The system of claim 1, wherein transmitting the user code to the user comprises transmitting the user code to the user computing system.

11. A computer program product for a dual factor authorization system for authentication of a user, the computer program product comprising at least one non-transitory computer readable medium having computer-readable program code portions embodied therein, the computer-readable program code portions comprising:
 an executable portion for receiving, from a user computing system, a request to access an entity system;
 an executable portion for generating an authorization code associated with the user;
 an executable portion for extracting a client code and a user code from the authorization code;
 an executable portion for transmitting the client code to the user computing system via a first channel, wherein the client code is not visible to the user;
 an executable portion for transmitting the user code to the user via a second channel;
 an executable portion for combining the client code and the user code into a reformed authorization code using a context grid, wherein the context grid is a matrix of characters corresponding to the authorization code; and
 an executable portion for comparing the authorization code with the reformed authorization code to determine authorization of the user to access the entity system.

12. The computer program product of claim 11, the computer-readable program code portions further comprising:
 an executable portion for detecting that the reformed authorization code matches the authorization code; and
 an executable portion for authorizing the user to access the entity system.

13. The computer program product of claim 11, the computer-readable program code portions further comprising:

an executable portion for detecting that the reformed authorization code does not match the authorization code; and an executable portion for rejecting the request to access the entity system.

14. The computer program product of claim 11, wherein the authorization code is restricted to a first context, wherein the reformed authorization code comprises a second context, the computer-readable program code portions further comprising:

an executable portion for detecting that the reformed authorization code matches the authorization code;

an executable portion for detecting that the first context does not match the second context; and an executable portion for rejecting the request to access the entity system.

15. The computer program product of claim 11, the computer-readable program code portions further comprising:

an executable portion for generating a hash of the authorization code using a hash algorithm;

an executable portion for storing the hash of the authorization code in a database; and an executable portion for generating a hash of the reformed authorization code using the hash algorithm, wherein comparing the authorization code with the reformed authorization code comprises comparing the hash of the authorization code with the hash of the reformed authorization code.

16. A computer-implemented method for a dual factor authorization system for authentication of a user, the method comprising:

receiving, from a user computing system, a request to access an entity system;

generating an authorization code associated with the user;

extracting a client code and a user code from the authorization code;

transmitting the client code to the user computing system via a first channel, wherein the client code is not visible to the user;

transmitting the user code to the user via a second channel;

combining the client code and the user code into a reformed authorization code using a context grid, wherein the context grid is a matrix of characters corresponding to the authorization code; and comparing the authorization code with the reformed authorization code to determine authorization of the user to access the entity system.

17. The computer-implemented method of claim 16, the method further comprising:

detecting that the reformed authorization code matches the authorization code; and authorizing the user to access the entity system.

18. The computer-implemented method of claim 16, the method further comprising:

detecting that the reformed authorization code does not match the authorization code; and rejecting the request to access the entity system.

19. The computer-implemented method of claim 16, wherein the authorization code is restricted to a first context, wherein the reformed authorization code comprises a second context the method further comprising:

detecting that the reformed authorization code matches the authorization code;

detecting that the first context does not match the second context; and rejecting the request to access the entity system.

20. The computer-implemented method of claim 16, the method further comprising:

generating a hash of the authorization code using a hash algorithm;

storing the hash of the authorization code in a database; and generating a hash of the reformed authorization code using the hash algorithm, wherein comparing the authorization code with the reformed authorization code comprises comparing the hash of the authorization code with the hash of the reformed authorization code.

* * * * *